United States Patent [19]
Kunze

[11] Patent Number: 5,504,276
[45] Date of Patent: Apr. 2, 1996

[54] CABLE INTRODUCTION SEAL IN THE CABLE INTRODUCTION AREA OF A CABLE FITTING

[75] Inventor: Dieter Kunze, Neuried, Germany

[73] Assignee: Siemens Aktiengesellschaft, Munich, Germany

[21] Appl. No.: 257,098

[22] Filed: Jun. 7, 1994

[30] Foreign Application Priority Data

Aug. 11, 1993 [DE] Germany .......................... 43 26 973.7

[51] Int. Cl.⁶ ................................... H01B 17/30
[52] U.S. Cl. .................. 174/151; 174/152 G; 174/65 G; 174/65 R; 16/2; 248/56
[58] Field of Search ............................. 174/151, 152 G, 174/153 G, 50.59, 65 G, 65 SS, 65 R, 72 R; 16/2; 248/56

[56] References Cited

U.S. PATENT DOCUMENTS

| | | | |
|---|---|---|---|
| 3,054,847 | 9/1962 | Colbert | 174/88 R |
| 3,056,852 | 10/1962 | Sachs | 174/153 G |
| 3,744,008 | 7/1973 | Castellani | 248/56 |
| 4,030,741 | 6/1977 | Fidrych | 285/161 |
| 4,033,535 | 7/1977 | Moran | 248/56 |
| 4,109,911 | 8/1978 | Giebel et al. | |
| 4,255,614 | 3/1981 | Channell | 174/93 |
| 4,350,840 | 9/1982 | Michaels | 174/65 SS |
| 4,358,079 | 11/1982 | Navarro | 248/56 |
| 4,525,000 | 6/1985 | Bachle | 174/65 SS X |
| 5,208,427 | 5/1993 | Couto et al. | 174/65 SS |

FOREIGN PATENT DOCUMENTS

| | | |
|---|---|---|
| 0402653 | 12/1990 | European Pat. Off. |
| 1949345 | 4/1971 | Germany . |
| 2309649 | 8/1974 | Germany . |
| 7607339 | 7/1976 | Germany . |
| 0955312 | 9/1982 | U.S.S.R. .......................... 174/65 SS |
| 724596 | 2/1955 | United Kingdom . |
| WO92/20077 | 11/1992 | WIPO . |

Primary Examiner—Kristine L. Kincaid
Assistant Examiner—Paramita Ghosh
Attorney, Agent, or Firm—Hill, Steadman & Simpson

[57] ABSTRACT

The invention is directed to a cable introduction seal, having a conically fashioned annular seal of elastic material pressed against the likewise conically fashioned introduction opening. The pressing of the annular seal ensues with the assistance of a pressure element in axial direction. The annular seal is preferably provided with a longitudinally proceeding slot, so that it can also be employed on uncut cables.

17 Claims, 3 Drawing Sheets

CABLE INTRODUCTION SEAL IN THE CABLE INTRODUCTION AREA OF A CABLE FITTING

BACKGROUND OF THE INVENTION

The invention is directed to a cable introduction seal composed of an annular seal of elastic material and of an introduction opening adapted therefor in the cable introduction area of a cable fitting.

Such cable introduction seals are known, for example from European Letters Patent EP 0 402 653 A2. This discloses a cable introduction seal of deformable material in the form of an annular plug composed of an expanded elastomer that is introduced into a cable introduction opening in the form of a sleeve of a housing.

Further, introduction seals for uncut cables are known in the form of what are referred to as grommets or, respectively, rubber bushings. These, for example, are mounted in pre-drilled, divided seal members, whereby the planes of division of the seal members are sealed with viscoplastic compound. Simple screw-type connections in the manner of standard stuffing boxes are employed for cut cables to be subsequently introduced. Several disadvantages, however, derive given such seal inserts and screw-type seals. Various known techniques use seals having elastic properties and seals of viscoplastic materials, combined. The spring excursion of the pressed rubber parts thus deriving is extremely small, so that low stored spring power or, respectively, hardly any stored spring power is available for the durable or long lasting pressing. This leads to losses of tightness over time, particularly given longer cyclical temperature stressing. The range of cable diameters to be bridged with these seals is comparatively small, so that corresponding matching elements are necessary. A blind plug must be respectively inserted given non-occupation of an introduction opening.

SUMMARY OF THE INVENTION

An object of the present invention is to provide a cable introduction seal with which the afore-mentioned disadvantages are largely overcome whereby a relatively great range of cable diameters can be accommodated economically and efficiently, a retightening capability that is effective over time must be established and whereby the seal must be fashioned such that it is releasable and re-employable after disassembly, without damage.

The stated object is achieved with a cable introduction seal in the form of an annular plug of elastomer introduced into a cable introduction opening in the form of a sleeve of a housing in that the cable introduction opening is fashioned conically converging; in that the annular seal has at least its outside matched to the conical course of the cable introduction opening; in that a pressure means acting on the annular seal in axial direction is arranged at the wide end of the cable introduction opening.

The advantages of the invention over the prior art are that elastic, conical annular seals can be employed for the sealing through the cable introductions, these seals being compressed by an axially acting pressure means within the cable introduction openings which are likewise conically fashioned. Especially good force conditions derive due to the conical fashioning, these leading to the fact that a pressing against the respectively introduced cable ensues in a broad range. A relatively great retightening capability that is preserved over time derives due to the axial compression. In addition, this spring effect can also be intensified by separate, annular spring inserts that can be introduced between the annular surface at the wide end of the annular seal and the annularly fashioned pressure means.

The conical annular seal is preferably initially fashioned closed as a cap at the narrow end, so that unoccupied cable introduction openings are initially closed upon insertion of such an annular seal. Additional elements are thus not required and the cap must merely be cut off as needed. As a result of the conical fashioning, a rough matching to the diameter of the cable to be introduced can thereby simultaneously ensue by cutting at an appropriate location. When the conical annular seal is also provided with a longitudinal slot, then it can also be utilized given uncut cables. However, the cable fitting must then also be fashioned cut with a cable introduction parting plane. Due to the axial pressing power with the assistance of the pressure means, the longitudinal slot is in turn closed as a consequence of the compressive pressure. The sealing effect in the parting surfaces is increased when the annular seal is moistened with suitable fats or oils. The friction upon impression is thereby reduced and a better filling of narrow gaps and striations is additionally possible as a consequence of the better glidability.

Such a cable introduction seal of the invention can be employed in any type of sleeve when the required cooperating surfaces are correspondingly conically fashioned. Thus, the cable introduction opening must comprise a conical fashioning matched to the annular seal, so that the latter can be pressed in along this conical surface. Such a fashioning is applicable for both divided as well as undivided cable introduction regions. A combination is also possible, within a cable introduction area, for example, both divided as well as undivided cable introduction openings can be arranged in the end face of a seal member of a sleeve. Cut and uncut cables can be introduced in this way in such an introduction area.

The conical cable introductions are preferably fashioned such that the wide end is located in the inside of the cable fitting and the narrow end points toward the outside, as a result whereof the pressing region in the inside of the sleeve is likewise protected.

The cable introduction openings are expediently fashioned as projecting connecting pieces, namely having such a length that the introduced cables are supported at the free ends of the connecting pieces given bending loads. It is thereby especially the shearing forces that are kept away from the region of the cable introduction seal.

Given divided cable introductions, the problem of sealing between the annular seal and a profiled seal of the parting plane is resolved in that the profiled seal and annular seal, particularly one having a laterally applied rib, are pressed together in a common channel that proceeds parallel to the conical shape.

The half shells of a cable sleeve or of a seal member composed of two halves, as can likewise be employed, are pressed against one another in a known way, whereby the mutual sealing ensues with the profiled seal.

The assembly with a cable introduction seal of the invention ensues in the following steps:

1) Bringing the individual sleeve parts together;

2) Matching the annular seal to the diameter of the cable to be introduced, whereby the inside diameter is approximately the same as the cable diameter;

3) Introduce cables either through the opening of the annular seal or, potentially, through the longitudinal slot of the annular seal;

4) Apply pressure means and screw the pressure means in axial direction for compressing the annular seal;

5) Close sleeve cylinder.

The invention shall now be set forth in greater detail with reference to six Figures.

DETAILED DESCRIPTION OF THE PREFERRED EMBODIMENTS

Figure 1:
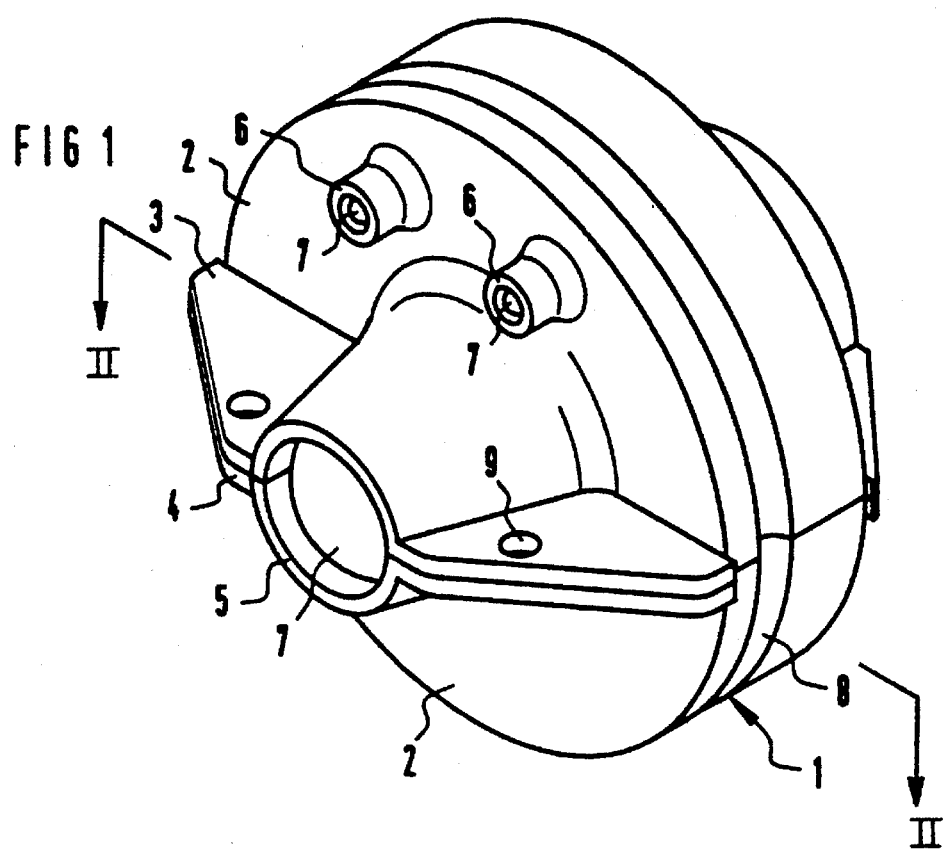
FIG. 1 is a perspective view of a divided seal member having an introduced cable introduction seal.

As an exemplary embodiment of a cable introduction area, FIG. 1 shows a seal member 1 that can be employed at the face side of a socket pipe. This seal member 1 is longitudinally divided in a parting plane P, so that it can also be employed given the introduction of uncut cables. A cable introduction opening 5 is applied in this parting plane P, whereby this cable introduction opening projects from the front side of the seal member 1 into a connecting piece. The conical annular seal 7 that is still closed at its front side can be seen in this connector-shaped cable introduction opening 5. The halves 2 of the seal member are pressed together with the assistance of applied flanges 3 and 4 and with clamping screws in the bores 9. It is also indicated that cable introduction openings 6 through which only cut cables can be introduced, can be additionally arranged in this seal member 1 since these openings are not longitudinally divided. The ring seals 7 introduced can also be seen here. It is also possible that a plurality of cable introductions are provided in the parting plane 4. A socket pipe is clamped over the seal member 1, whereby a seal insert is placed into the sealing channel 8 for sealing.

Figure 2:
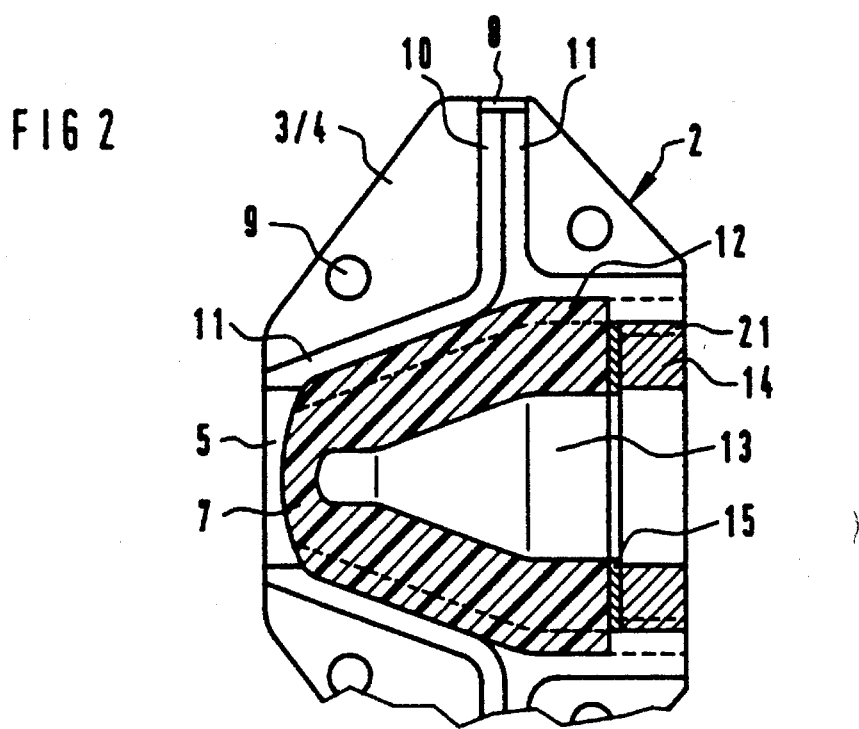
FIG. 2 is a sectional view of the cable introduction seal taken generally along line II—II of FIG. 1, in the parting plane of the seal member.

FIG. 2 then illustrates the arrangement of the conical annular seal 7 that is introduced in a divided, conically fashioned cable introduction opening 5. The flanges 3 or, respectively, 4 may be seen in the parting plane shown here, whereby the profiled seal 10 and the annular seal 7, preferably with an applied rib 12, are tightly pressed against one another in a common sealing channel 11 that proceeds parallel to the conical shape of the annular seal 7 as well. The annular seal 7 is still shown here as a cap-shaped, closed shaped part, whereby the cut ensues at the location corresponding to the cable diameter as needed in accord with the diameter of the cable to be introduced. Threads 21 are cut, for example, at the wide end of the conical fashioning of the introduction opening, the pressure means being screwed into the threads 21, for example in the form of a ring nut 14. A compression spring insert 15 is introduced in addition to the annular seal 7 and the ring nut 14, this compression spring insert 15 serving the purpose of maintaining a defined pressing power. By screwing the ring nut 14 in, the annular seal 7 is axially pressed against the conical annular surface of the cable introduction opening, the sealing ensuing as a result thereof. When a cable is introduced, the annular seal 7 is also simultaneously pressed against the introduced cable, the sealing being assured as a result thereof. For a longitudinal slot in the annular seal, pressing is likewise carried out such that the necessary sealing ensues along the longitudinal slot.

Figure 3:
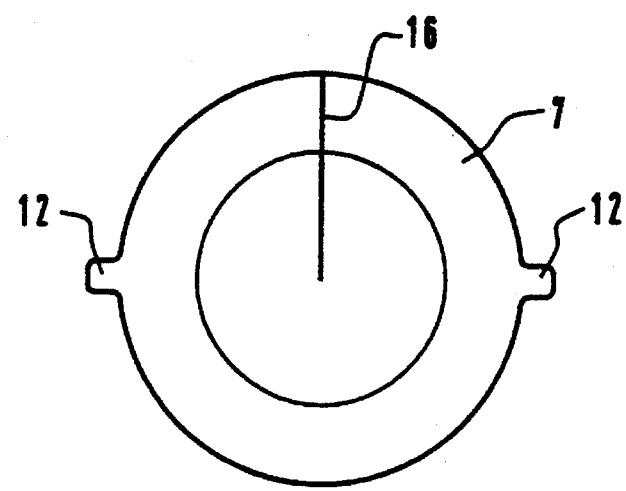
FIG. 3 is a right side view of the annular seal shown in FIG. 2.

FIG. 3 shows a front view of a conically fashioned annular seal 7, whereby lateral ribs 12 are additionally applied, these serving the purpose of sealing vis-a-vis the profiled seals of the longitudinal seal of the cable sleeve or, respectively, of the seal member. It may also be seen that the annular seal 7 comprises a longitudinal slot 16, so that this annular seal 7 can also be utilized given uncut cables.

Figure 4:
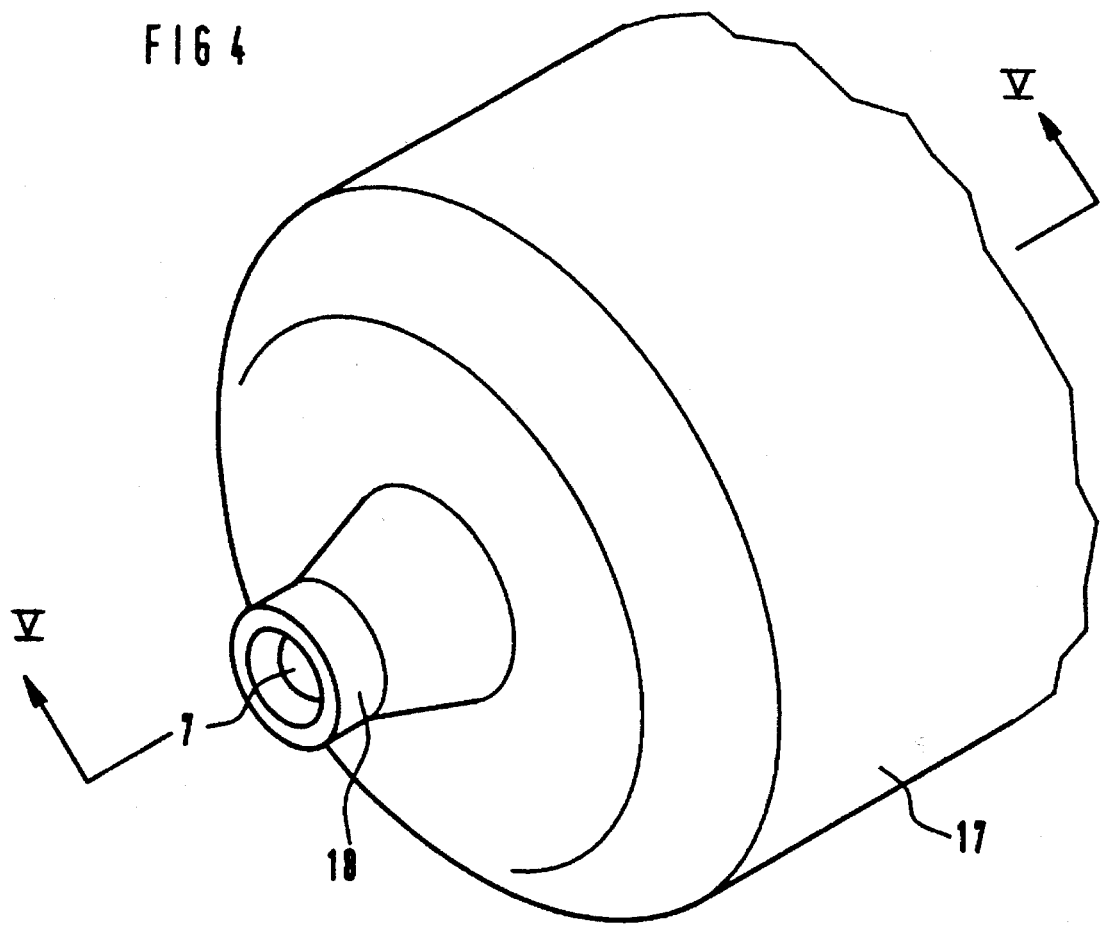
FIG. 4 is a perspective view showing the use of an annular seal of the invention in a cable introduction connecting piece of a cable sleeve.

FIG. 4 shows that an annular seal 7 of the invention can also be utilized given uncut introduction areas of a cable sleeve 17, whereby this corresponds to the cable introductions 6 already described in FIG. 1. This cable introduction is fashioned as a connecting piece 18 here, this having such a length that an introduced cable can support itself against the outermost end of the ring given bending loads. The bending loads are thereby kept away from the seal region.

Figure 5:
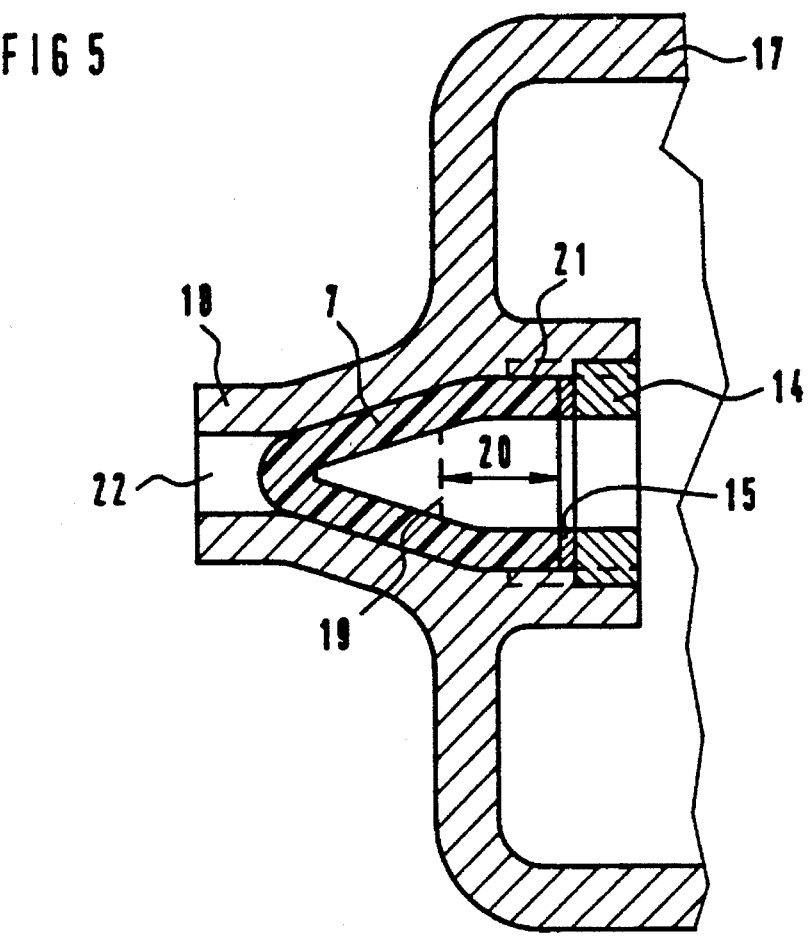
FIG. 5 is a sectional view taken generally along line V—V of FIG. 4, through the cable introduction opening of the exemplary embodiment of FIG. 4.

In a cross-section, FIG. 5 now shows the embodiments of FIG. 4, whereby the conditions that have already been described can again be seen therein. The annular seal 7 fashioned conically and cap-shaped is pressed in the conical cable introduction opening 22 with the assistance of an annular forcing nut 14. It is also indicated that a storing of the spring power of the material in the region 20 is possible as a result of the impression. The line 19 indicates that the annular seal 7 can be cut off up to this point; this corresponds to the maximally introducible cable diameter.

Figure 6:
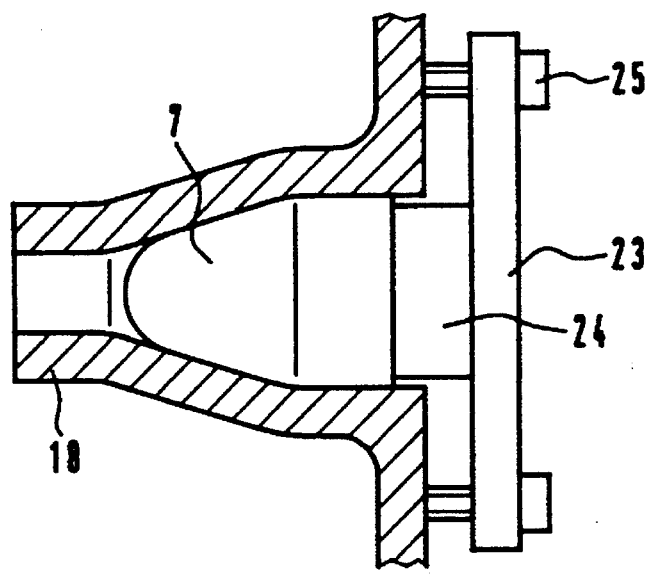
FIG. 6 is a partial sectional view of a modification for a pressure means of the cable introduction seal.

In FIG. 6, finally, it is shown that other pressure means can also be utilized, thus, for example, a pressure plate 23 that can be divided and that can be pressed in against the annular seal 7 with screws 25. A projection 24 thereby enables a better guidance within the cable introduction opening. Compression spring inserts can also be utilized here, as were already set forth above. This example is intended to illustrate that other exemplary embodiments are also conceivable with which the same functioning can be achieved.

Given introductions in divided introduction areas, it is not only the annular seal but also the pressure means that must be divided in longitudinal direction so that they can be put in place on an uncut cable. After being put in place, the annular seal and the pressure means must again be annularly closed. Thus, an annular pressure screw can, for example, be composed of two-half parts that are connected to one another via a film hinge, catch or guide cams.

Although the present invention has been described with reference to a specific embodiment, those of skill in the art will recognize that changes may be made thereto without departing from the scope and spirit of the invention as set forth in the appended claims.

I claim as my invention:

1. A cable introduction seal, comprising:

an annular seal of elastic material; and a cable fitting having an introduction opening adapted for receiving said annular seal, wherein the cable introduction opening is fashioned having its inside wall conically convergent, and wherein the annular seal has at least its outside matched to the inside wall of the cable introduction opening, and a pressure means arranged at a wide end of the cable introduction opening for acting in an axial direction to compress the annular seal;

wherein said cable fitting is longitudinally divided at a parting plane, and wherein the cable introduction opening is arranged in the parting plane;

and comprising at least one cable introduction opening arranged outside the parting plane.

2. A cable introduction seal according to claim 1, wherein the pressure means comprises a ring nut that can be axially screwed into a thread at the wide end of the cable introduction opening.

3. A cable introduction seal according to claim 1, wherein the pressure means comprises a pressure plate that is provided with a projection adapted to be pressed into the wide end of the cable introduction opening acting axially on the annular seal.

4. A cable introduction seal according to claim 1, wherein the annular seal is composed of rubber.

5. A cable introduction seal according to claim 1, wherein the annular seal is closed cap-shaped at a conically tapering end.

6. A cable introduction seal according to claim 1, wherein the annular seal is longitudinally divided.

7. A cable introduction seal according to claim 1, further comprising an annular washer inserted between an annular surface of the annular seal and the pressure means.

8. A cable introduction seal according to claim 1, further comprising a compression spring insert arranged between an annular surface of the annular seal and the pressure means.

9. A cable introduction seal according to claim 1, wherein the cable fitting comprises a connecting piece extending from the introduction opening drawn forward as a cable support.

10. A cable introduction seal according to claim 1, wherein the pressure means is composed of two longitudinally divided halves that can be fixed to one another via fixing means.

11. A cable introduction seal according to claim 1, wherein the conical fashionings of the cable introduction openings and of the annular seal proceed tapering outward.

12. A cable introduction seal according to claim 1, wherein the surfaces of the annular seal are moistened with fat or oil.

13. A cable introduction seal, comprising:

an annular seal of elastic material; and a cable fitting having an introduction opening adapted for receiving said annular seal, wherein the cable introduction opening is fashioned having its inside wall conically convergent, and wherein the annular seal has at least its outside matched to the inside wall of the cable introduction opening, and a pressure means arranged at a wide end of the cable introduction opening for acting in an axial direction to compress the annular seal;

wherein the surfaces of the annular seal are moistened with fat or oil.

14. A cable introduction seal according to claim 1, wherein said cable fitting is longitudinally divided at a parting plane, and wherein the cable introduction opening is arranged in the parting plane.

15. A cable introduction seal according to claim 14, wherein said cable fitting comprises a common seal channel arranged in the parting plane of the longitudinally divided cable fitting, the annular seal having an applied rib being pressed tightly in said seal channel.

16. A cable introduction seal according to claim 15, wherein shells of the divided cable fitting of a seal member are assembled against one another across the parting plane having a profiled seal inserted at least partly in the seal channel between the shells and against said applied rib.

17. A cable introduction seal according to claim 13 comprising at least one cable introduction opening arranged outside the parting plane.

* * * * *